United States Patent
de Theije

(10) Patent No.: US 7,019,747 B2
(45) Date of Patent: Mar. 28, 2006

(54) METHOD FOR DISPLAYING DATA

(75) Inventor: Pascal Alfred M. de Theije, Leiden (NL)

(73) Assignee: Nederlandse Organisatie Voor Toegepastnatuurwetenschappelijk Onderzoek Tno, Delft (NL)

( * ) Notice: Subject to any disclaimer, the term of this patent is extended or adjusted under 35 U.S.C. 154(b) by 5 days.

(21) Appl. No.: 10/479,147

(22) PCT Filed: May 30, 2002

(86) PCT No.: PCT/NL02/00347

§ 371 (c)(1),
(2), (4) Date: Jun. 2, 2004

(87) PCT Pub. No.: WO02/097731

PCT Pub. Date: Dec. 5, 2002

(65) Prior Publication Data

US 2004/0199273 A1    Oct. 7, 2004

(30) Foreign Application Priority Data

May 31, 2001    (NL)    .................................... 1018185

(51) Int. Cl.
*G06T 11/20* (2006.01)
(52) U.S. Cl. .................................................... 345/440
(58) Field of Classification Search ................ 345/581, 345/582, 589, 440, 440.1, 440.2
See application file for complete search history.

(56) References Cited

U.S. PATENT DOCUMENTS

| | | | |
|---|---|---|---|
| 4,825,449 A * | 4/1989 | McKissock | 345/440 |
| 5,315,562 A | 5/1994 | Bradley et al. | |
| 2001/0016690 A1* | 8/2001 | Chio | 600/485 |
| 2003/0143554 A1* | 7/2003 | Berres et al. | 435/6 |

FOREIGN PATENT DOCUMENTS

JP    8015432    1/1996

OTHER PUBLICATIONS

J. Dow et al, "A Comparison of Several Data-Rate-Reduction Techniques for Sonar", Proceedings of the NATO Advanced Study Institute on Signal Processing, Loughborough, Leics., UK, Aug. 21-Sep. 1, 1972, pp. 429-447.

P. Ravier et al, "Combining an Adapted Wavelet Analysis with Fourth-order Statistics for Transient Detection", Signal Processing, European Journal Devoted to the Methods and Applications of Signal Processing, vol. 70, No. 2, Oct. 30, 1998, pp. 115-128.

S. Mills, "Usability Problems of Acoustical Fishing Displays", Displays, vol. 16, No. 3, 1995, pp. 115-121.

* cited by examiner

*Primary Examiner*—Matthew Luu
(74) *Attorney, Agent, or Firm*—Michaelson & Associates; Peter L. Michaelson

(57) ABSTRACT

A method is described for displaying data, wherein the data consists of a number of samples $N_r$ that is much larger than the number of samples $N_s$ that can be displayed on a display. According to the invention sets of $N_c = N_r/N_s$ samples are formed and for each set $N_c$ a single value $x_t$ is determined according to a specific algorithm by which important features as reflected by the samples, despite the reduction in samples, still can be displayed with a better SNR than with presently known methods.

5 Claims, 3 Drawing Sheets

Figure 1:
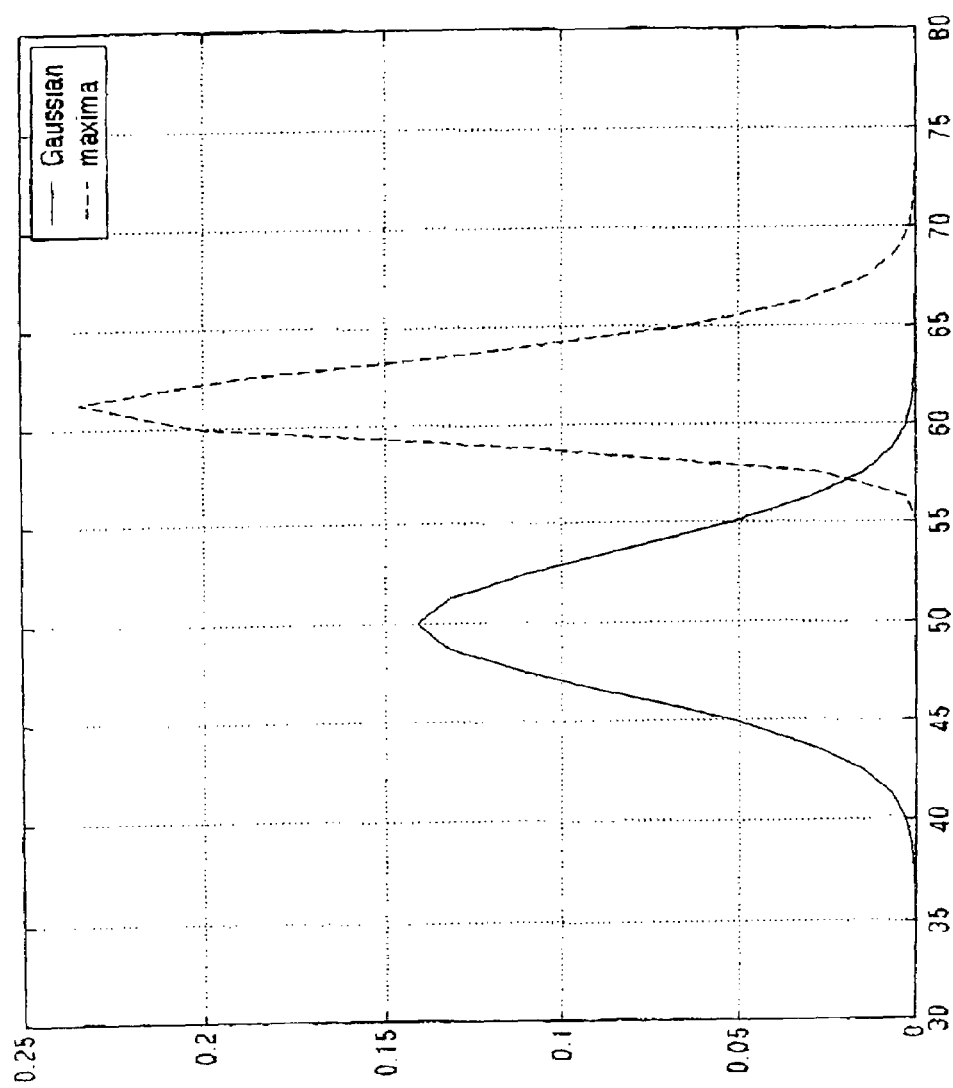

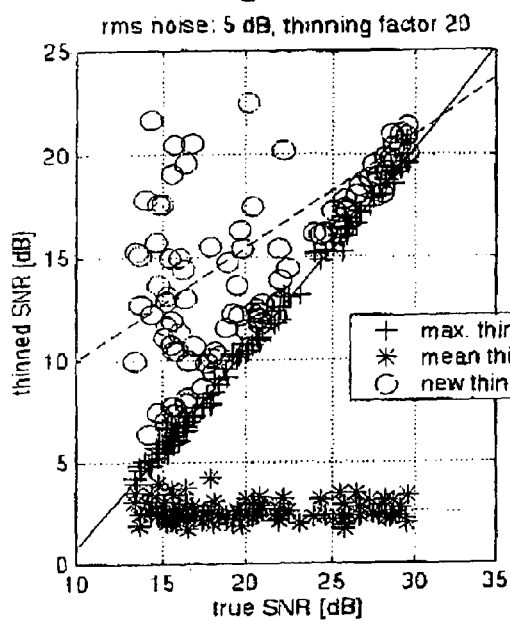
Fig. 3a
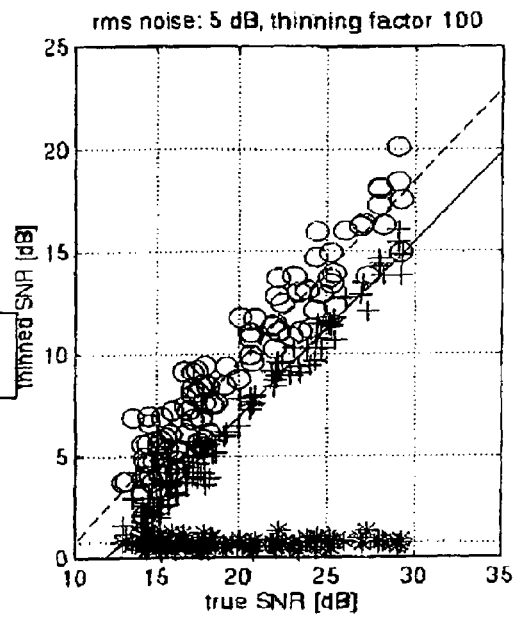
Fig. 3b
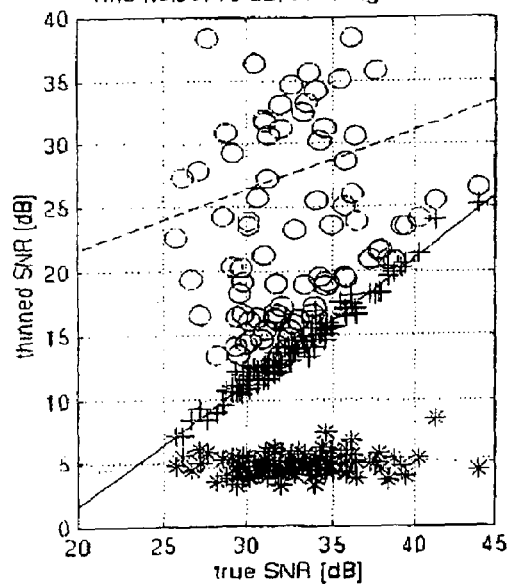
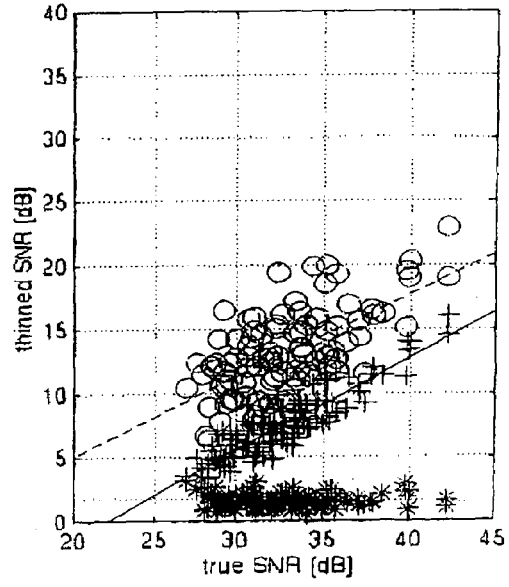
Fig. 3c
Fig. 3d

METHOD FOR DISPLAYING DATA

The invention relates to a method for displaying data, wherein the available data in at least one dimension consists of samples $p_i$ with i=1, ... $N_r$, wherein the display is able to reproduce a number of $N_s$ samples, with $N_s<N_r$, wherein sets each of a number of $N_c=N_r/N_s$ samples are formed and each set of $N_c$ samples is reduced to a single value to adapt it to the amount of displayable samples $N_s$.

In many image forming techniques, such as sonar, radar, seismology, tomography etc. there are situations that the amount of data that is obtained is much larger than the amount of data that can be displayed on for example a graphical screen, such as a monitor. Such graphical screens for example are able to display 1024 pixels in a horizontal direction and 768 pixels in a vertical direction.

In modern imaging techniques it is possible to have for example 60,000 samples or pixel-data that have to be plotted along an axis and in order not to loose relevant information, it is necessary to reduce the obtained data in such a manner that on the one side relevant data are displayed in any case and on the other side the number of data is decreased to the number that can be handled by the display.

Although this problem is present in many imaging techniques as mentioned above, in the following the problem with the present techniques for reducing data to be displayed will be explained at the hand of examples from sonar techniques, wherein sound pulses are emitted and possible reflections of these pulses by objects are received Such an emitted sound pulse and all echo's received from it generally is called a "ping".

Present sonars can transmit pulses with a bandwidth of at least, B=500 Hz. The range resolution of such a pulse is c/2B=1.5 m (c, the speed of sound in water=1500 m/sec). In sonar, it is quite common to display the output of an entire ping on the screen. In such a display the acoustic energy is shown versus range (i.e., time after transmission) and bearing. The number of bearing angles is typically of the order of a few 100 (e.g., 0–360 degrees, in intervals of 1–2 degrees). However, the number of range samples may get very large. For the above example, if the ping repetition time is one minute and the sampling rate is 1.000 Hz, the number of range samples is 1.000×60=60.000. This is much more than any graphical screen can handle. By simply plotting this data on the screen most range samples will not be shown and one does not know which samples that are. If a detection happens to be at such not shown range samples it will not be visible, which may have severe consequences.

One should also keep in mind that the problem as sketched in the foregoing is a displaying problem to visualize the data as good as possible for the operator. All computations, such as determining echo levels, echo lengths, and range calculations, can be done on the unreduced raw data, and no computer screen is involved there.

One conventional way to get around the problem of displaying images comprising to much data for the display screen involved, is the following:

1. For each ping, determine the number of samples, $N_r$.
2. Determine the number of samples that the screen can handle, $N_s$.
3. Determine the number of samples that should be combined into sets of samples $N_c=\lceil N_r/N_s \rceil$, where $\lceil x \rceil$ denotes the smallest integer larger than x.
4. Replace each set of $N_c$ samples by a 'characteristic value' within that set of samples.
5. Display this characteristic value.

The problem now is to define a characteristic value for each set of $N_c$ samples. A few options are straightforward: the mean, or the maximum.

Table 1 shows an overview of some echo levels (for the sake of simplicity called features 1, 2 and 3) and background noise, for 4 different ways of reducing the data with $N_c=64$. The features considered are listed in column 1, the feature levels without reduction are in column 2 (for reference). In column 3 the maximum of every 64 samples is taken. In column 4 the mean of every 64 samples is taken. In column 5 first the mean over 4 samples is taken, and then the maximum over 16 samples that are combined in this manner. All values are mean values over 15 pings, and the values in parentheses are standard deviations over these 15 pings.

By taking the maximum the real peak values (such as for feature 1 and 2) are retained, but the mean noise level increases significantly w.r.t. the level when no date reduction is applied. The SNR's (Signal to Noise Ratios) decrease by about 7 dB. This is illustrated in columns 2 and 3 of Table 1 where the levels of the features 1, 2, 3, and noise are shown for the experiment under consideration.

| Feature | No reduction | 'max' reduction | 'mean' reduction | 'mean-max' reduction | New algorithm |
|---|---|---|---|---|---|
| 1 | 129.4 (1.9) | 129.4 (1.9) | 116.3 (2.5) | 126.1 (2.0) | 125.3 (4.0) |
| 2 | 94.2 (15.7) | 94.2 (15.7) | 80.2 (11.3) | 90,0 (14.8) | 90.4 (16.2) |
| 3 | 83.7 (2.0) | 83.7 (2.0) | 74.3 (2.6) | 81.7 (2.4) | 81.5 (3.9) |
| Noise | 68.2 (0.4) | 75.9 (0.3) | 66.8 (0.3) | 71.7 (0.3) | 68.6 (0.3) |
| SNR feature 1 | 59.3 (2.1) | 51.9 (2.0) | 47.9 (2.5) | 52.8 (1.8) | 55.1 (4.1) |
| SNR feature 2 | 26.0 (15.6) | 18.3 (15.6) | 13.4 (11.2) | 18.3 (14.7) | 21.9 (16.0) |
| SNR feature 3 | 15.5 (1.8) | 9.4 (2.9) | 7.5 (2.4) | 10.0 (2.3) | 13.0 (8.8) |
| Mean SNR diff. | 0.0 | −7.1 | −10.7 | −6.6 | −3.6 |

Taking the mean of each set of $N_c=64$ samples does give the correct noise level, but the (sharp) peaks get weaker and may even become invisible, again reducing the SNR by about 10 dB as indicated in column 4 of Table 1. Neither of these two methods thus gives the desired result.

The reduction in SNR due to taking the mean or maximum can be illustrated by a very simple simulation, in which 1000 Gaussian distributions of $N_c=64$ points are generated, the absolute value is taken for all $N_c=64$ points, and the maximum and mean are then calculated. Over 1000 iterations the mean difference between the maximum and mean is about 10 dB.

One already proposed way to improve upon the two conventional methods of thinning the data is to combine them: first take the mean over a number of samples, and then take the maximum over a number of such combined samples. Basically, the first step corresponds to a post-integration of the data, and the number of samples to take the mean over should correspond to the expected feature size. The second step, taking the maximum, should then be applied over 64/4=16 samples.

Column 5 of Table 1 shows the result of this. The mean SNR is better than the SNR if only the mean or only the maximum is taken, but still almost 7 dB lower than that without applying any thinning. If the mean is taken over 2 or 8 samples and then the maximum over 32 or 8 samples, respectively, the SNR's for feature 1 are 52.7 and 52.6 dB, respectively, and those for feature 3 9.3 and 9.6 dB, respectively.

An object of the invention is to improve the known methods for reducing data to be displayed, wherein relevant data, such as reflections in sonar techniques, are displayed with a better SNR than with the known data reduction techniques. To obtain this object, the method according to the invention is characterized in that each set of $N_c$ samples $p_i$ is replaced by the single value $x_i = \max[(1-c_i)y_i + c_i z_i]$ i=1, 2, ... $N_c$, wherein:
1) $y_i$ is determined by the following steps:
    a. calculating a linear fit to the set of $N_c$ samples, preferably by means of the least squares method,
    b. estimating the standard deviation $\sigma$ with respect to this fit;
    c. rejecting sample values $p_i$ deviating more than 2–3 times $\sigma$ from the fit determined in step a); and
    d. calculating a linear fit $y_i$ to the set of the non-rejected samples, preferably by means of the least squares method,
2) $z_i$ is calculated by:

$$z_i = x_i - y_i;$$

3) the standard deviation $\sigma$ of $z_i$ is calculated;
4) for each value $z_i$ the value $z_i/\sigma$ is calculated;
5) the significance $c_i$ of all $N_c$ samples is determined with $c_i \in (0,1)$ wherein $c_i$=the normalized integral of f(M) between M =$-\infty$ and $z_i/\sigma$, with f(M)=the probability density function of the maximum M of the expected background distribution with $N_c$ samples; and
6) $x_i$ is determined by $x_i = \max[(1-c_i)y_i + c_i z_i]$.

If the maximum of $x_i$ is large (as compared to the mean), the value of $c_i$ should be close to 1, and if the maximum is comparable to the mean, the value of $c_i$ should be close to 0 (but has little effect then).

For those skilled in the art, it will be clear that the least squares method is a simple and reliable manner to obtain a linear fit to a set of data, i.e. samples, but that there are many other well-known methods to determine a linear fit to a set of data, which also could be used for the present method.

In many cases, the background samples exhibit a Gaussian distribution. It can be shown that for a Gaussian distribution of $N_c$ samples, with mean $\mu$ and standard deviation $\sigma$, the probability density function of the maximum M is $$f(M) = N_c \left(\frac{1}{2} + \frac{1}{2}\mathrm{erf}\left(\frac{M-\mu}{\sigma\sqrt{2}}\right)\right)^{N_c - 1} \frac{1}{\sigma\sqrt{2\pi}} \exp\left\{-\frac{1}{2}\left(\frac{M-\mu}{\sigma}\right)^2\right\} \quad (1)$$

(see Appendix A), where erf(u) is the error function defined by $$\mathrm{erf}(u) = \frac{2}{\sqrt{\pi}} \int_{-\infty}^{u} \exp(-t^2)\,dt \quad (2)$$

An example of this distribution is shown in FIG. 1, for a Gaussian with mean $\mu$=50 and standard deviation $\sigma$=5. The mean value of the distribution of maxima f(M) with $N_c$=64 is 61.7 and the standard deviation is 3.5. This indicates that even for a random Gaussian distribution (noise), the maximum is expected to be larger than a few times $\sigma$. For a maximum in a specific range interval to be really significant, it should be at least as large as a typical value of f(M).

If the normalized integral of f(M) is, e.g., 0.9 at M=$M_O$, this means that the probability that the maximum of the 'background' distribution is smaller than $M_O$ is 0.9. The probability that the identified maximum M=$M_O$ is due to the 'background' is 0.1 or less, or, the probability of it not being part of the 'background' is at least 0.9. This explains the method in step 5.

The levels of the distinct features as obtained after reducing the data with the above-described method are listed in column 5 of Table 1. It is clear that the levels of features 1, 2 and 3 are still lower than those of the unreduced data by 3–4 dB, but the background noise level is almost identical. Especially for lower SNR the method works better than the above described conventional mean and maximum method. The algorithm according to the invention certainly is not perfect, but this also is impossible: by rejecting 63 out of every 64 samples, one will always loose information The SNR's, however, are 3.5 dB higher than those for the 'max'-thinning, and 7.1 dB than those for the 'mean'-thinning, and the method according to the invention is thus clearly better than the two conventional ones. It is also better than the extended conventional method, by 3.0 dB in this case.

It should be reminded that the described method should only be used for displaying the sampling data: any actual measurements, such as (automatic) detection, classification, SNR-calculation, evaluating the echo length, etc., should always be performed on the unreduced data. The method of the invention however, is very valuable because in general an operator likes to "see" a feature himself instead of just getting an alarm from the computer.

The method of the invention can quite easily be extended to non-Gaussian distributions. The only difference is the distribution over maxima, f(M), in equation (1). Appendix B gives the calculation of f(M) for e.g. a Raleigh distribution with the parameter $\alpha$.

Figure 2A:
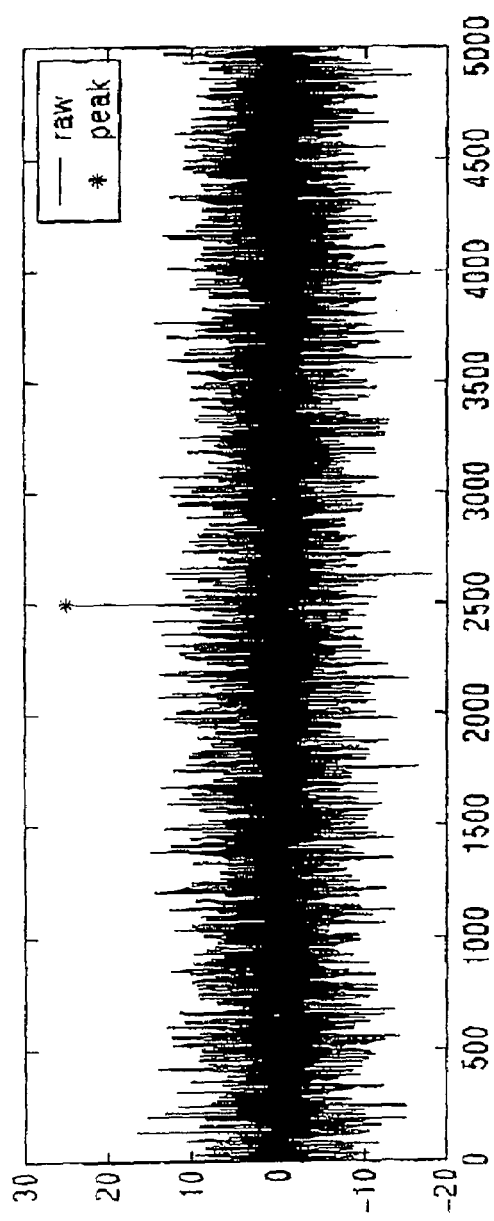
Figure 2B:
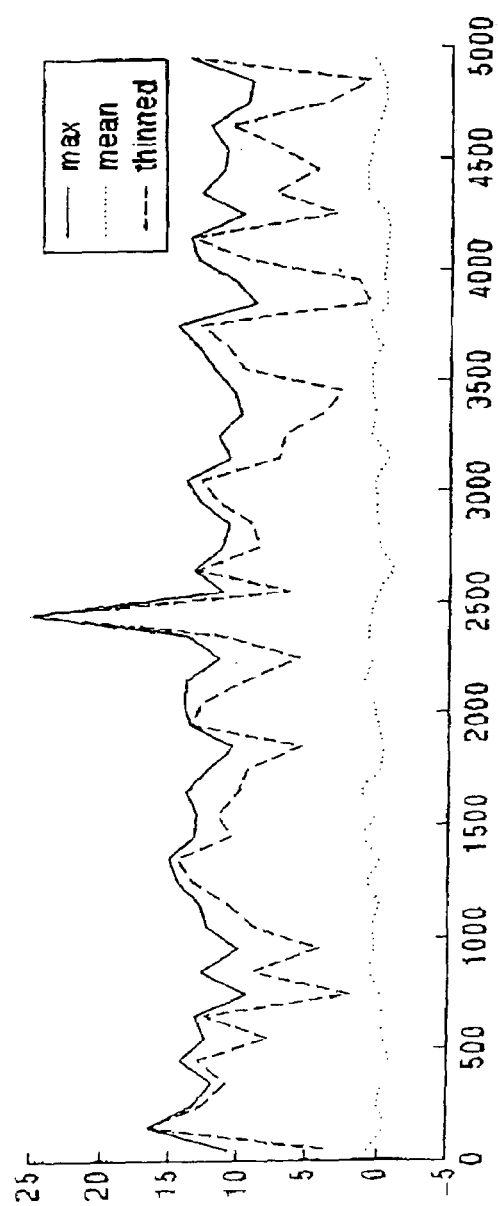

To illustrate the difference between the various methods to reduce the data more clearly, a one-dimensional data vector of 5.000 samples is generated. This vector only contains noise, generated according to a Gaussian distribution with mean 0 and standard deviation 5 (in arbitrary units). One sample, #2.500, is given an output equal to 25, representing a true feature (corresponding to a SNR of 14 dB). This data is shown in FIG. 2*a* as line 1. In FIG. 2*b*, line 2 indicates the data reduced by taking the maximum over each set of $N_c$=100 samples; line 3 shows the data reduced by taking the mean over each set of $N_c$=100 samples; line 4 shows the data thinned by the method of the invention. It is clear that line 2 follows the maxima in the original data, whereas line 3 is almost constantly zero (the mean value). Line 4 is intermediate between the two: it gets zero sometimes but also picks out some maxima It has to be noted that FIGS. 2*a* and *b* in fact have to be shown as one single figure, but that the lines 2, 3, 4 would be invisible against the background of FIG. 2*a* in such a single figure.

A further simulation is used to evaluate the differences between the various thinning methods. A sequence of 1.000 points is generated 100 times, the points being Gaussian distributed with mean 0 and variance $\sigma$, equal to 5 dB (FIG.

3a, b) or 10 dB (FIG. 3c, d). A single pixel is then set to a value between 5 and 30 dB, representing a detection. Then the true SNR is computed as being the maximum of the sequence minus the mean, and the reduced SNR's are computed in the same way, but after reducing the sequence by a factor 20 (FIG. 3a, c) or 100 (FIG. 3b, d). In FIG. 3, the line 1 denotes the results after reducing by taking the maximum, the line 2 after reducing by taking the mean, and the line 3 after reducing by the method according to the invention.

The 'mean-reduction' clearly performs worst, and line 2 (representing the least-squares fit) is almost horizontal. This indicates that the SNR after reduction has no relation to the true SNR, which is highly unwanted. The lines 1 and 3 show a much better performance, and are almost parallel in the case of a reduction factor of 100 (FIG. 3d).

The parameters of the least-squares fits are given in Table 2. These fits reflect the conclusions of FIG. 3 once more: the new method is better than just taking the maximum and is much better than taking the mean. The loss is still 5 dB for a reduction factor of 20, and 10 dB for a reduction factor of 100 and a r.m.s. scatter in the noise of 5 dB (being a realistic value in sonar operations). These numbers are approximately equal to $10^{10} \log(\sqrt{\text{thinning factor}})$, which basically means that by thinning by a factor of N, a factor $\sqrt{N}$ of information is lost.

TABLE 2

| Reducing method | Reduction factor 20 | | Reduction factor 100 | |
|---|---|---|---|---|
| | Fit (SNR$_{thin}$ = a SNR$_{true}$ + b) | Mean difference [dB] | Fit (SNR$_{thin}$ = a SNR$_{true}$ + b) | Mean difference [dB] |
| r.m.s. scatter in noise = 5 dB | | | | |
| Max | 0.97x − 8.95 | −9.47 | 0.86x − 10.37 | −13.03 |
| Mean | 0.01x + 2.31 | −17.46 | −0.01x + 0.79 | −18.97 |
| New | 0.40x + 8.10 | −4.58 | 0.88x − 7.87 | −10.23 |
| r.m.s. scatter in noise = 10 dB | | | | |
| Max | 0.93x − 16.53 | −18.75 | 0.75x − 17.41 | −25.18 |
| Mean | −0.01x + 5.52 | −27.18 | 0.01x + 1.21 | −30.87 |
| New | 0.30x + 16.51 | −5.16 | 0.76x − 12.27 | −19.87 |

To those skilled in the art, it will be clear that the method according to the invention also can be applied in more dimensions, for example when on a display also the data to be displayed in the y-direction comprises more data than that pixels on the display are available.

Appendix A

In this Appendix the distribution f(M) over the maxima of Gaussian distributions is derived. That is, given a large number of Gaussian distributions each with mean μ and standard deviation σ, what is the probability distribution of the maximum values of such Gaussian distributions.

Define $$f_x(x) = \frac{1}{\sigma\sqrt{2\pi}} \exp\left\{-\frac{(x-\mu)^2}{2\sigma^2}\right\}$$

being the Gaussian distribution with mean μ and standard deviation σ. Define the cumulative distribution $F_x(x)$ as $$F_x(x) = \int_{-\infty}^{x} f_x(t)\,dt$$

$$= \int_{-\infty}^{x} \frac{1}{\sigma\sqrt{2\pi}} \exp\left\{-\left(\frac{t-\mu}{\sigma\sqrt{2}}\right)^2\right\} dt$$

$$= \frac{1}{\sqrt{\pi}} \int_{-\infty}^{\frac{x-\mu}{\sigma\sqrt{2}}} \exp(-u^2)\,du$$

$$= \frac{1}{2}\text{erf}\left(\frac{x-\mu}{\sigma\sqrt{2}}\right) + \frac{1}{2}$$

where u=(t−μ)/σ√2 was substituted. If the maximum of x and y is z, then $F_z(z) = F_x(z) F_y(z)$, or more generally $$\text{if } \max(x_i, \ldots, x_N) = z \Rightarrow F_z(z) = \prod_{i=1}^{N} F_{x_i}(z)$$

In the present case $$F_z(z) = \prod_{i=1}^{N} \left(\frac{1}{2}\text{erf}\left(\frac{x-\mu}{\sigma\sqrt{2}}\right) + \frac{1}{2}\right)$$

Then the probability distribution $f_z(z)$ is equal to the partial derivative of $F_z(z)$ to z:

$$f_z(z) = \frac{\partial}{\partial z} F_z(z) = \frac{\partial}{\partial z} \prod_{i=1}^{N} F_{x_i}(z) = \frac{\partial}{\partial z} (F_{x_i}(z))^N$$

$$= N(F_{x_i}(z))^{N-1} f_{x_i}(z)$$

$$= N\left(\frac{1}{2}\text{erf}\left(\frac{z-\mu}{\sigma\sqrt{2}}\right) + \frac{1}{2}\right)^{N-1} \frac{1}{\sigma\sqrt{2\pi}} \exp\left(-\frac{(z-\mu)^2}{2\sigma^2}\right)$$

Appendix B

If $f_x(x)$ is a Rayleigh distribution, the same type of derivation can be done as in Appendix A. The Rayleigh distribution with parameter α is given by $$f_x(x) = \frac{x}{\alpha} \exp\left\{-\frac{x^2}{2\alpha}\right\}, \; x > 0$$

Then the cumulative distribution, $F_x(x)$, is $$F_x(x) = \int_{-\infty}^{x} f_x(t)\,dt = -\exp\left(-\frac{x^2}{2\alpha}\right) + 1$$

Then the cumulative distribution over the maxima z of $f_x(x)$ is $$F_z(z) = \prod_{i=1}^{N} F_{x_i}(z) = \prod_{i=1}^{N}\left(1 - \exp\left(\frac{-x^2}{2\alpha}\right)\right)$$

Then the probability distribution, $f_z(z)$, over the maxima is $$f_z(z) = \frac{\partial}{\partial z} F_z(z) = \frac{\partial}{\partial z}\prod_{i=1}^{N} F_{x_i}(z) = \frac{\partial}{\partial z}(F_{x_i}(z))^N$$

$$= N(F_{x_i}(z))^{N-1} f_{x_i}(z)$$

$$= N\left(1 - \exp\left(-\frac{z^2}{2\alpha}\right)\right)^{N-1} \frac{z}{\alpha} \exp\left(-\frac{z^2}{2\alpha}\right)$$

The invention claimed is:

1. A method for displaying data, wherein the available data in at least one dimension consists of samples $p_i$ with $i=1, \ldots N_r$, wherein the display is able to reproduce a number of $N_s$ samples, with $N_s < N_r$, wherein sets each of a number of $N_c = N_r/N_s$ samples are formed and each set of $N_c$ samples is reduced to a single value to adapt it to the amount of displayable samples $N_s$, characterized in that each set of $N_c$ samples $x_i$ is replaced by the single value $x_t = \max[(1-c_i)y_i + c_i z_i]$ with $i=1, 2, \ldots N_c$, wherein:

1) $y_i$ is determined by the following steps:
  a. calculating a linear fit to the set of $N_c$ samples;
  b. estimating the standard deviation $\sigma$ with respect to this fit;
  c. rejecting samples $x_i$ deviating more than a predetermined number of times $\sigma$ from the fit determined in step a); and
  d. calculating a linear fit $y_i$ to the set of the non rejected samples;

2) $z_i$ is calculated by:

$$z_i = x_i - y_i;$$

3) the standard deviation $\sigma$ of $z_i$ is calculated;
4) for each value $z_i$ the value $z_t$ is calculated;
5) the significance $c_i$ of all $N_c$ samples is determined with $c_i \epsilon (0,1)$ wherein $c_i \approx$ the normalized integral of f(M) between $M = -\infty$ and $z_t/\sigma$, with f(M)=the probability density function of the maximum M of the expected background distribution with $N_c$ samples; and
6) $x_t$ is determined by $x_t = \max[(1-c_i)y_i + c_i z_i]$.

2. The method of claim 1, wherein the linear fit in step 1a and d is determined by means of the least squares method.

3. The method of claim 1, wherein the predetermined number of times in step 1c is 2 to 3.

4. The method according to claim 1, characterized in that $$f(M) = N_c\left(\frac{1}{2} + \frac{1}{2}\mathrm{erf}\left(\frac{M-m}{s\sqrt{2}}\right)\right)^{N_c-1} \frac{1}{2\sqrt{2\pi}} \exp\left\{-\frac{1}{2}\left(\frac{M-m}{\sigma}\right)^2\right\} \quad (1)$$

wherein:

$$\mathrm{erf}(u) = \frac{2}{\sqrt{\pi}} \int_{-\infty}^{u} \exp(-t^2)\,dt. \quad (2)$$

5. The method according to claim 1, characterized in that $$f(M) = N_c\left(1 - \exp\left(-\frac{M^2}{2\alpha}\right)\right)^{N_c-1} \frac{M}{\alpha} \exp\left(-\frac{M^2}{2\alpha}\right).$$

* * * * *